J. F. O'CONNOR.
FRICTION BUFFER FOR RAILWAY CARS.
APPLICATION FILED OCT. 30, 1909.
976,903.
Patented Nov. 29, 1910.
2 SHEETS—SHEET 1.
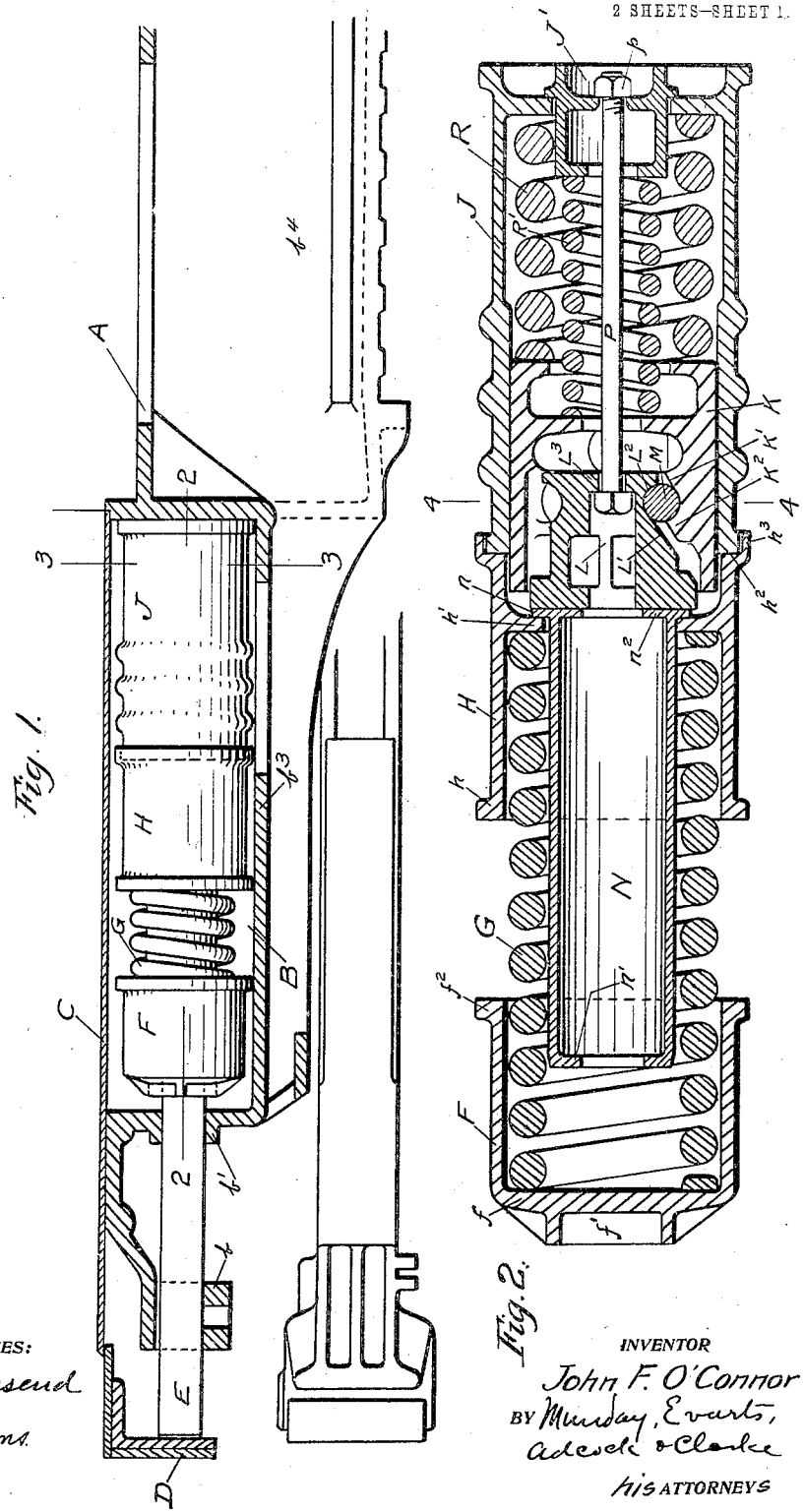
WITNESSES:
F. B. Townsend
Pearl Abrams
INVENTOR
John F. O'Connor
BY Munday, Evarts,
Adcock & Clarke
his ATTORNEYS

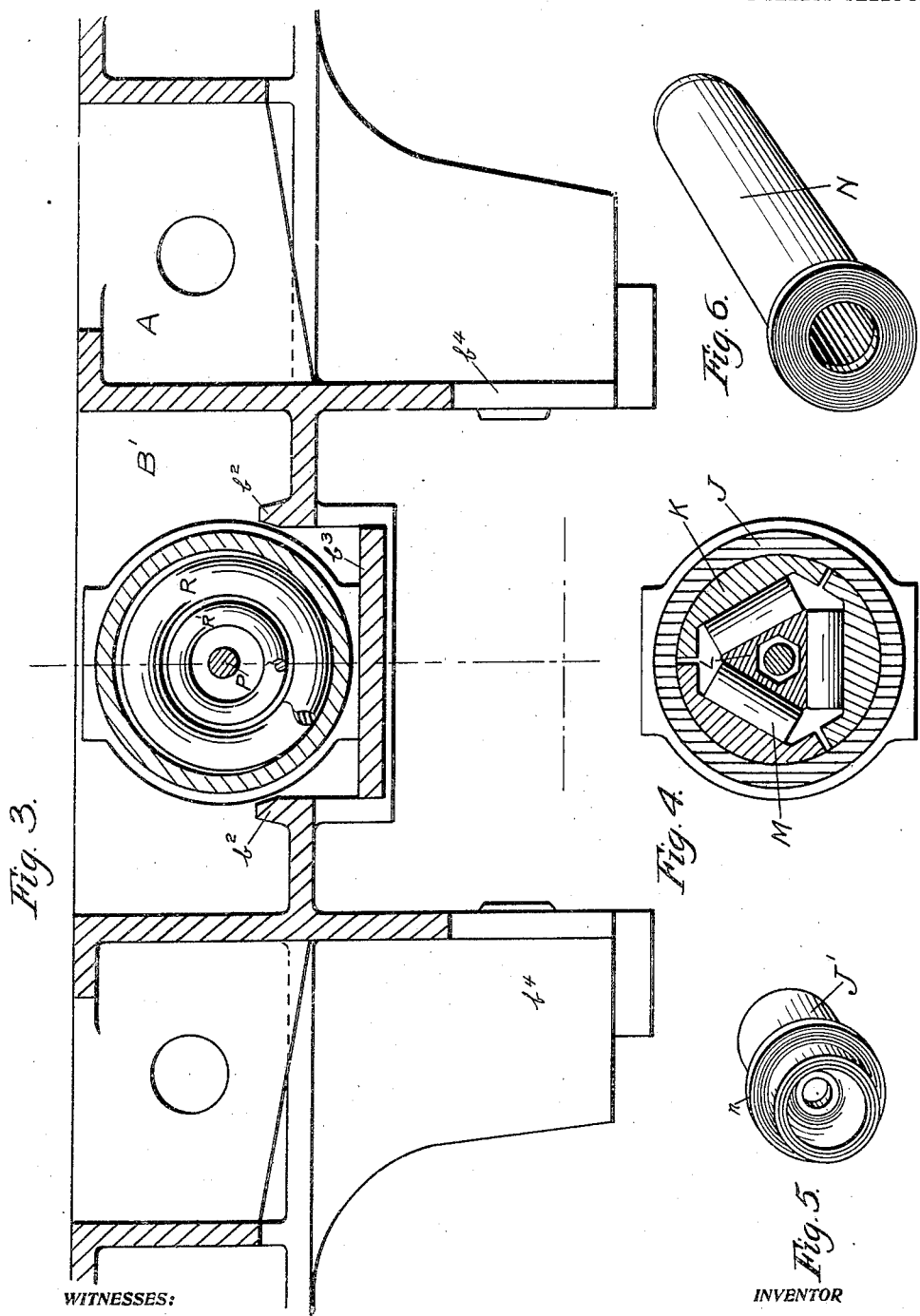

UNITED STATES PATENT OFFICE.

JOHN F. O'CONNOR, OF CHICAGO, ILLINOIS, ASSIGNOR, BY MESNE ASSIGNMENTS, TO WILLIAM H. MINER, OF CHICAGO, ILLINOIS.

FRICTION-BUFFER FOR RAILWAY-CARS.

976,903.

Specification of Letters Patent.

Patented Nov. 29, 1910.

Application filed October 30, 1909. Serial No. 525,411.

*To all whom it may concern:*

Be it known that I, JOHN F. O'CONNOR, a citizen of the United States, residing in Chicago, in the county of Cook and State of Illinois, have invented a new and useful Improvement in Friction-Buffers for Railway-Cars, of which the following is a specification.

My invention relates to friction buffers, the same being specially adapted for use upon railway passenger cars.

The object of my invention is to provide a friction buffer of a strong, simple, efficient and durable construction which will accommodate and provide for a comparatively extensive movement of the buffer plate as required for use on vestibule passenger cars or sleeping cars, in which the buffer plate will have a sensitive and quickly responsive spring cushion for the greater portion of its movement and at the same time have a powerful friction cushion for the smaller and final portion of its movement, and in which the friction cushioning devices or elements will have a certain and reliable release action, so that the buffer plate will be restored to normal position after each successive buffing action.

To practically accomplish this object or result, and herein my invention consists, I secure to the end frame of the car body a buffer cage, cradle or frame and mount therein the reciprocating buffer bar against which the buffer plate acts, a long buffer spring which reacts at its front end against a spring cap which is interposed between the spring and buffer bar, and at its rear end against an intermediate thrust member or cylinder, and a friction shell against the front end of which the intermediate thrust member bears, and containing friction shoes, a wedge, interposed anti-friction rollers and a short buffer spring which reacts at one end against the friction shell and at the other end against the friction shoes, and a secondary thrust member or thimble interposed between the wedge of the friction mechanism and the spring cap against which the buffer bar acts so that after the long buffer spring has been partially compressed, preferably about two-thirds, the further movement of the buffer bar will act against the wedge and friction shoes and short buffer spring of the friction cushioning mechanism, thus giving, during the limited final movement of the buffer plate, a powerful friction cushioning action. The intermediate thrust member acting directly against the friction shell which abuts at its rear end against the buffer cage or frame relieves the wedge and friction shoes and spring of the friction cushioning mechanism from the tension and pressure of the front or long buffer spring, so that this front buffer spring does not interfere with the proper release action of the wedge and friction shoes or friction cushioning mechanism. The intermediate thrust member or cylinder which is interposed between the friction shell and the spring cap also serves as a stop to limit the compression of the front or long buffer spring and prevents the same being compressed completely solid or injured.

My invention also consists in the novel construction of parts and devices and in the novel combinations of parts and devices herein shown and described and more particularly specified in the claims.

In the accompanying drawing forming a part of this specification, Figure 1 is a side elevation partly in central vertical section of a friction passenger car buffer embodying my invention. Fig. 2 is a detail horizontal section on line 2—2 of Fig. 1. Fig. 3 is a detail vertical section on line 3—3 of Fig. 1. Fig. 4 is a cross section on line 4—4 of Fig. 2. Fig. 5 is a detail perspective view of the removable cap at the rear end of the friction shell. Fig. 6 is a detail perspective view of the secondary thrust member or thimble.

In the drawing, A represents a portion of the front end frame of a railway passenger car, B the buffer cage, frame or cradle, C the steel floor plate of the vestibule of the car, preferably secured to and supported by the buffer frame or cradle B, D the buffer plate, E the buffer bar, F the spring cap, G the long or front buffer spring, H the intermediate thrust member or cylinder, J the friction shell, K the friction shoes, L the wedge, M anti-friction rollers, N the secondary thrust member or thimble, P the connecting bolt between the wedge and the removable cap J¹ of the friction shell and R the short buffer spring of the friction cushioning mechanism.

The buffer cage, cradle or frame B is secured to or forms part of the framework of the car and is provided with suitable bearings or supports $b$ $b^1$ to receive the buffer bar E, and with a chamber $B^1$ beneath the vestibule plate C to receive the buffer cushioning devices, and with saddles or seats $b^2$ $b^2$ $b^3$ $b^3$ for supporting the friction shell J, the spring cap F and the intermediate thrust member or cylinder H, and with depending wings or arms $b^4$ to receive the draft rigging of the car coupler. The spring cap F is preferably cylindrical and its front head $f$ is furnished with a socket $f^1$ to receive the rear end of the buffer bar E. The spring cap F is provided at its rear end with a projecting flange or arm $f^2$ to abut against the enlarged front end $h$ of the intermediate thrust member or cylinder H when both the front or long buffer spring G and rear buffer spring R are compressed to their full extent. The intermediate thrust member or cylinder H is preferably cylindrical in form and is provided with an internal shoulder or seat $h^1$ for the rear end of the front or long buffer spring G to bear against. The intermediate thrust member or cylinder H is provided at its rear end with a shoulder $h^2$ to bear against the front end of the friction shell J and a bell or enlargement $h^3$ to surround or embrace the front end of the friction shell. The friction shell J is preferably cylindrical in form and has an internal friction face in sliding frictional engagement with the external friction faces of the segmental friction shoes K. The friction shoes K are preferably three in number and each has a wedging or inclined inner face $K^1$ and stop shoulder $K^2$ for the anti-friction roller M which is interposed between each of the friction shoes K and the wedge L which has a corresponding number of inclined or wedging faces $L^1$ and shoulders $L^2$.

The secondary thrust member or thimble N is preferably cylindrical in form and fits within the front or main buffer spring G and serves as a support or guide therefor, as well as a thrust member to transfer the thrust of the buffer bar E and spring cap F to the wedge L of the friction cushioning mechanism. This secondary thrust member N is furnished with an external flange or rim $n$ which engages the internal flange or shoulder $h^1$ of the intermediate thrust member H. The secondary thrust member or thimble N is also provided with an inwardly projecting flange $n^1$ at its front end to afford an extended bearing against the spring cap F, and also with an inwardly projecting flange $n^2$ at its rear end to give it a better seat against the wedge L. The wedge L is preferably hollow and provided with a shoulder $L^3$ to engage the head of the connecting bolt P which extends through the short or rear buffer spring R and the small spring $R^1$ which preferably fits within the rear spring R. The connecting rod P has a nut $p$ at its rear end which engages the removable cap $J^1$ with which the friction shell J is provided at its rear end. The removable cap or block $J^1$ serves as a centering device or guide for the rear spring R and as a seat for the small spring $R^1$ to bear against. The front or long spring G preferably has about three times the compressing movement of the rear springs R $R^1$. During the greater part of the rearward or buffing movement of the buffer plate, the main buffer spring G only is compressed, the main spring G thus serving to cushion all the frequent and smaller movements of the buffer plate and giving it a quickly responsive movement and sensitive action. Under heavier blows and more extended movements of the buffer plate, the friction cushioning mechanism comes into play and affords a very powerful cushioning action, the same acting in multiple with the main spring G, the anti-friction rollers interposed between the friction shoes and wedges in connection with the intermediate thrust member H, which relieves the wedge from the direct and constant tension of the main spring G, enabling the cushioning mechanism to always certainly, quickly and promptly release or return to normal position after each buffing action.

By my improved combination and arrangement of devices constituting my friction buffer, it will be seen that, for example, when the springs G and R are fully compressed under a heavy buffing blow, that any release movement of the spring cap F will instantly be followed up by the frictional devices, the wedge L keeping the intermediate compression member N always against the spring cap F until the friction devices are returned completely to their full release position, and thus insures that the frictional or heavy cushioning mechanism will always be in position to receive a succeeding blow. In the release movement after the friction shoes have been returned to normal position, the further release movement of the spring cap F under action of the spring G will restore the parts to the position shown in Fig. 2.

I claim:—

1. In a friction buffer for railway cars, the combination with a buffer cage having a saddle for receiving and supporting the buffer bar and its cushioning devices, of a buffer bar, a spring cap engaging said bar, an intermediate thrust member, a main buffer spring interposed between said spring cap and intermediate thrust member, a friction shell engaging said intermediate thrust member at one end and said buffer cage at the other, a spring, friction shoes, a wedge with interposed anti-friction rollers within said shell and a secondary thrust member interposed between said wedge and said spring cap to transmit the thrust of the buffer bar to said wedge and friction shoes after the main buffer spring has been partially compressed, substantially as specified.

2. In a friction buffer for railway cars, the combination with a buffer cage having a saddle for receiving and supporting the buffer bar and its cushioning devices, of a buffer bar, a spring cap engaging said bar, an intermediate thrust member, a main buffer spring interposed between said spring cap and intermediate thrust member, a friction shell engaging said intermediate thrust member at one end and said buffer cage at the other, a spring, friction shoes, a wedge with interposed anti-friction rollers within said shell and a secondary thrust member interposed between said wedge and said spring cap to transmit the thrust of the buffer bar to said wedge and friction shoes after the main buffer spring has been partially compressed, said secondary thrust member having an externally projecting flange adapted to engage said intermediate thrust member, substantially as specified.

3. In a friction buffer, the combination with a buffer bar and spring cap, of a friction shell having a spring, friction shoes and wedge therein, a main buffer spring interposed between said spring cap and said friction shell and a secondary thrust member interposed between said wedge and said spring cap and operating to transmit the pressure of the buffer bar to the wedge, friction shoes and said spring within said friction shell independent of said main buffer spring after said main spring has been partially compressed, both said springs coacting together to resist and cushion the final portion of the buffer bar movement, substantially as specified.

4. In a friction buffer, the combination with a buffer bar, spring cap and main buffer spring reacting against said cap, of a friction shell against which said main buffer spring reacts, a spring, friction shoes and wedge within said shell, and a secondary thrust member interposed between said wedge and said spring cap and operating to transmit the pressure of the buffer bar to the wedge independent of said main buffer spring, substantially as specified.

JOHN F. O'CONNOR.

Witnesses:
EDMUND ADCOCK,
PEARL ABRAMS.